United States Patent
Usui (10) Patent No.: US 8,036,519 B2
(45) Date of Patent: Oct. 11, 2011

(54) MOTION COMPENSATION DEVICE AND PHOTOGRAPHIC DEVICE

(75) Inventor: Kazutoshi Usui, Kawasaki (JP)

(73) Assignee: Nikon Corporation, Tokyo (JP)

( * ) Notice: Subject to any disclaimer, the term of this patent is extended or adjusted under 35 U.S.C. 154(b) by 328 days.

(21) Appl. No.: 12/058,297

(22) Filed: Mar. 28, 2008

(65) Prior Publication Data

US 2008/0240695 A1    Oct. 2, 2008

(30) Foreign Application Priority Data

Mar. 29, 2007   (JP) ................................ 2007-089727

(51) Int. Cl.
  *G03B 17/00*   (2006.01)
(52) U.S. Cl. ........................................................ 396/55
(58) Field of Classification Search ................... 396/55; 248/208.1
  See application file for complete search history.

(56) References Cited

U.S. PATENT DOCUMENTS

| | | | |
|---|---|---|---|
| 5,576,787 A | | 11/1996 | Kai et al. |
| 5,615,397 A | * | 3/1997 | Shiomi et al. .................... 396/55 |
| 5,794,081 A | * | 8/1998 | Itoh et al. ......................... 396/55 |
| 6,704,501 B1 | * | 3/2004 | Washisu ........................... 396/55 |
| 2002/0015587 A1 | | 2/2002 | Ohishi et al. |
| 2003/0053803 A1 | | 3/2003 | Washisu |
| 2005/0185057 A1 | * | 8/2005 | Seo ............................ 348/208.4 |
| 2008/0211922 A1 | * | 9/2008 | Murashima et al. ...... 348/208.99 |

FOREIGN PATENT DOCUMENTS

| | | | | |
|---|---|---|---|---|
| JP | 02301732 A | * | 12/1990 | ...................... 396/52 |
| JP | 2000-330152 | | 11/2000 | |

* cited by examiner

*Primary Examiner* — Clayton E Laballe
*Assistant Examiner* — Leon W Rhodes, Jr.
(74) *Attorney, Agent, or Firm* — Ditthavong Mori & Steiner, P.C.

(57) ABSTRACT

A motion compensation device comprising, a detector to detect a vibration of an imaging device which takes an image, a controller to control a compensation amount of an influence of said vibration based on an output of said detector, said controller increasing said compensation amount according to lapse of shooting time of said imaging device.

27 Claims, 7 Drawing Sheets

FREQUENCY CHARACTERISTIC EXAMPLE OF ANGULAR VELOCITY SENSOR

MOTION COMPENSATION DEVICE AND PHOTOGRAPHIC DEVICE

BACKGROUND OF THE INVENTION

1. Field of the Invention

The present invention relates to a motion compensation device to operate compensation of image blurring and an optical device.

2. Description of the Related Art

In recent years, it has been known that technologies not only compensating blurring motion by hand, but also compensating blurring which occurs when attached with a tripod. As a method for compensating a blurring occurred when attached with a tripod shooting, a technology shown in JP Patent Publication No. 2000-330152 is exemplified.

At the time of shooting with a tripod, a vibration which is different from hand blurring is occurred. In a technology shown in JP Patent Publication No. 2000-330152, memorizing a signal corresponding to blurring which occurs at the time of activating mechanism in a camera, a method for image blurring compensation on the basis of the memorized signal thereof is shown.

For example, although a main component of blurring frequency occurred at the time of tripod shooting is about 10 Hz and so, a high frequency component higher than 50 Hz is included in addition to the main component. There will be a risk for delayed response of lens against the high frequency component.

The present invention has been made due to considering these circumstances, a purpose of the invention is to provide a motion compensation device and an optical device available to compensate an image blurring effectively.

SUMMARY OF THE INVENTION

In order to achieve the above purpose, a motion compensation device of the present invention comprises;

a detector to detect a vibration of an imaging device which takes an image, a controller to control a compensation amount of an influence of said vibration based on an output of said detector, said controller increasing said compensation amount according to lapse of shooting time of said imaging device.

Another aspect of the motion compensation device of the present invention comprises;

a motion compensator to compensate said influence of said vibration by relatively moving an image formed with an optical system and an image pick-up face of said imaging device based on the output of said detector, wherein;

said controller may comprises;

a target position calculator which calculates a target position so as to move said motion compensator;

an amplifier which amplifies and outputs an image signal from said target position calculator; and an altering portion which increases amplification ratio of said amplifier according to lapse of shooting time of said imaging device.

Further aspect of the motion compensation devise of the present invention comprises;

a motion compensator to compensate said influence of said vibration by relatively moving an image formed with an said optical system and an image pick-up face of said imaging device based on the output of said detector, wherein;

said controller may comprises;

a target position calculator which calculates a target position so as to move said motion compensator; and an altering portion which changes said target position so as to increase a moving amount of said motion compensator according to lapse of shooting time of said imaging device.

Said controller may increase said compensation amount according to lapse of shooting time of said imaging device after decreasing said compensation amount in response to timing of shooting of said imaging device.

Said imaging device comprises a first output portion to output a first signal when the imaging device is in an image shooting mode where said imaging device is supported on a support base, wherein;

said controller may increase said compensation amount according to lapse of shooting time of said imaging device when said first signal is output from said first output portion.

Although a said support base is not particularly limited, said support base is a unipod or a tripod, for example.

Said imaging device comprises a determining portion to determine as to whether said imaging device is supported on said support base or not, based on the output of said detector, wherein;

said first output portion may outputs said first signal when said detector determines that said imaging device is supported on said support base.

Further aspect of the motion compensation device according to the present invention comprises an optical system holder to hold at least one portion of said optical system, wherein;

said optical system holder may relatively moves with respect to an image pick-up face of said imaging device in response to said compensation amount controlled by said controller.

Further aspect of the motion compensation device comprises an image pick-up element holder for holding an image pick-up element to pick-up an image by said optical system, wherein;

said image pick-up element holder may relatively moves with respect to at least one portion of said optical system in response to said compensation amount controlled by said controller.

A photographic device according to the present invention comprises;

a detector to detect a blurring of the device, a driving portion to be driven at least mechanically in response to shooting action, and a controller connected with said detector and said driving portion, the controller cooperating with said driving portion to control a compensation amount for blurring motion of said image so as to increase the compensation amount according to lapse of time after said driving portion driven.

Said controller may increase said compensation amount according to lapse of shooting time of said imaging device in response to shooting action.

Said driving portion is not particularly limited, and for example, is a shutter to cut off a photographic light or a mirror which retracts so as not to prevent the photographic light in response to shooting action.

Said controller may increase said compensation amount according to lapse of shooting time of said imaging device after reducing said compensation amount before said driving portion operates in response to shooting action.

Another aspect of the photographic device according to the present invention comprise a first output portion to output a signal to said controller, the signal showing that the device is supported on a support, wherein;

said controller may increase said compensation amount according to lapse of time after operating said driving portion in response to the output from said first output portion showing that the device is supported on the support base.

A motion compensation method according to the present invention comprises steps of;

detecting a blurring of a imaging device taking an image from an optical system with using a detector; and controlling a compensation amount for correcting said image on the basis of the detected blurring of said imaging device, wherein;

said compensation amount increases according to lapse of shooting time of said imaging device.

Said compensation amount may increase according to lapse of shooting time of said imaging device after decreasing said compensation amount in response to timing of shooting of said imaging device.

Said compensation amount may increase according to lapse of shooting time of said imaging device when a signal is output, showing a shooting mode where the imaging device is supported on a support base.

A method for manufacturing a motion compensation device according to the present invention comprises;

providing a detector to detect blurring of an imaging device which takes an image from an optical system;

connecting a controller with said detector to control a compensation amount for correcting said image blurring based on an output of said detector; and setting said controller to increase the compensation amount according to lapse of shooting time of said imaging device.

Said controller may be set to increase the compensation amount according to lapse of shooting time of said imaging device after decreasing said compensation amount in response to timing of shooting of said imaging device.

Said controller may be set to increase said compensation amount according to lapse of shooting time of said imaging device when a first signal is output at an image shooting mode that said imaging device is supported on a support base.

A method for manufacturing a motion compensation device according to the present invention comprises;

providing a detector which detects blurring of an imaging device which takes an image from an optical system;

connecting a controller with said detector to control a compensation amount for correcting said image blurring based on an output of said detector;

connecting said controller with a driving portion driven mechanically in response to shooting action of said imaging device;

setting said controller to increase said compensation amount according to lapse of time after driving said driving portion in response to shooting action of said imaging device.

Said controller may be set to increase said compensation amount according to lapse of shooting time of said imaging device after said compensation amount is decreased prior to driving said driving portion in response to shooting action of said imaging device.

Said controller may be set to increase said compensation amount according to lapse of shooting time of said imaging device, when a signal is provided to show that said imaging device is supported on the support base.

A photographic device according to the present invention comprises the above mentioned motion compensation device. In the present invention, a photographic device is not particularly limited, and includes a compact camera, a single lens reflex camera, a still/video camera, a lens barrel, a camera body, a cellular phone and the like.

DESCRIPTION OF THE PREFERRED EMBODIMENTS

Figure 1:
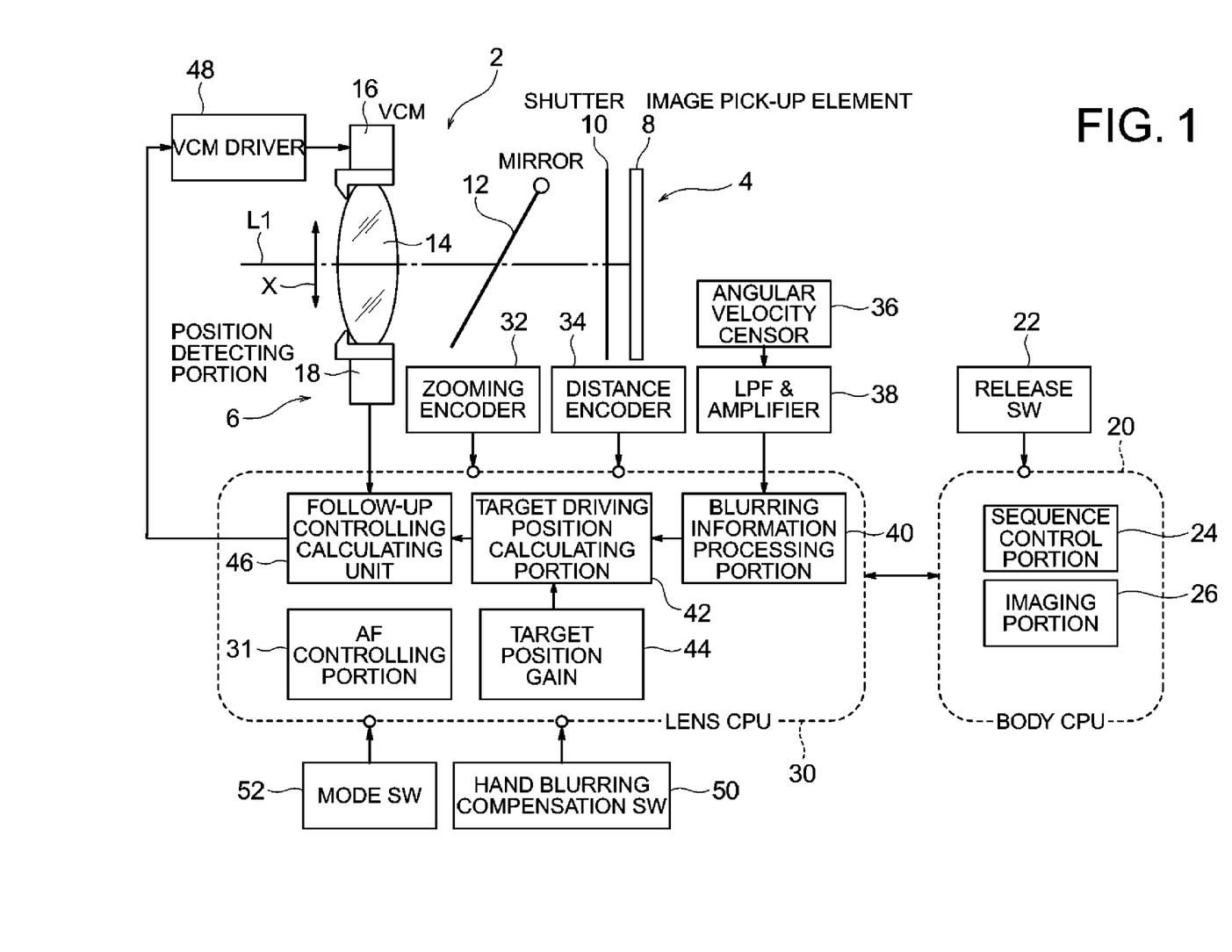
FIG. 1 is a schematic block view of a camera according to one embodiment of the present invention.

As shown in FIG. 1, a camera 2 according to one embodiment of the present invention comprises a camera body 4 and a lens barrel 6 detachably equipped to the camera body 4. A blurring motion compensation lens 14 and a lens group which is not shown are equipped inside of the lens barrel 6. Several lenses of the lens group are movably arranged along with an optical axis L1 for performing zooming operation and auto focusing operation.

An image pick-up element 8 and, in front of the element a shutter 10 are provided in the camera body 4. Also, a mirror 12 is arranged anteriorward of the optical axis L1 direction movably between a cut-off position of the optical axis L1 and an evacuating position where the optical axis L1 is not cut-off.

The camera body 4 comprises a body CPU 20, and the lens barrel 6 comprises a lens CPU 30. It is possible to communicate between the CPU 20 and CPU 30 in a status that the lens barrel 6 is equipped at the camera body 4. The CPU 20 and CPU 30 are a portion to operate, for example, for predetermined controlling or calculation.

The body CPU is included in the camera body 4 to perform a sequence controlling by a sequence control portion 24 with receiving an input signal from a release switch 22 and to conduct an image procession of a data taken by an image pick-up element B at an image taking portion 26. Also, the body CPU conducts a communication with the lens CPU 30.

The lens CPU 30 is included in the lens barrel 6 to control a motor for an auto focusing (AF) at AF controlling portion 31 and to conduct a communication with the body CPU 20. Also, the lens CPU 30 reads information from a zooming encoder 32 and a distance encoder 34 in a lens.

An angular velocity sensor 36 composed by a gyro sensor and the like is equipped in the camera body 4 or the lens barrel 6 and detects an angular velocity applied to a camera. A detected output of the angular velocity sensor is through a LPF (low pass filter)+an amplifier 38 in which unnecessary high frequent noise is removed, and the output is amplified until a certain level which is suitable to A/D of the body CPU 20. An output of the LPF+the amplifier 38 is input to a blurring information processing portion 40 at the lens CPU 40. In the blurring information processing portion 40, a blurring information to be corrected is extracted on the basis of information of the angular velocity sensor 36.

In the present embodiment, the lens CPU 30 contains a target driving position calculating portion 42. The target driving position calculating portion operates calculation for a target driving position of a plane direction X which is vertical to the optical axis L1 in the blurring motion compensation lens 14 based on information from the zooming encoder 32 and the distance encoder 42, and an output of the blurring information processing portion. Generation of a target driving position of pre-exposure centering motion mentioned below and target driving position gain altering operation during exposure based on a control signal from a target position gain changing portion 44 are operated in the target driving position calculating portion 42.

An output from the target driving position calculating unit 42 is input to a follow-up controlling calculating unit 46. In the follow-up controlling calculating unit 46, follow-up controlling calculation of the blurring lens is operated based on target driving position information.

An output signal from the follow-up controlling calculating unit 46 is input to a VCM driver 48. In the driver 48, power supplying operation to a voice coil motor (VCM) 16 is made according to a signal from the follow-up controlling calculating unit 46.

The VCM 16, which is an electromagnetic actuator, is composed of a coil and a magnet, and generates a driving force by applying an electric current to the coil. By this VCM 16, the blurring motion compensation lens 14 is driven to the plane direction X vertical to the optical axis L1 to operate motion compensation controlling. Note that a driving portion is not limited to the VCM 16, and may be PZT type actuators such as SIDM and the like, or STM and the like.

A position detecting portion 18 is equipped on a frame which supports the blurring motion compensation lens 14. The position detecting portion 18 detect a position of the blurring motion compensation lens 14. A sensor using PSD is general as the position detection 18. A detected position of the blurring motion compensation lens 14 detected by the position detecting portion 18 is feed back to the target driving portion calculating portion 42 via the follow-up controlling calculating unit 46. Note that a position sensor which detects alteration of magnetic flux density using a magnet and hall element may be used as the position detecting portion 18 which is not limited to the above mentioned PSD.

A hand blurring compensation switch 50 and a mode switch 52 are mounted on the camera body 4 or the lens barrel 6. The hand blurring compensation switch 50 is a switch for selecting on/off of the hand blurring compensation by a camera operator. When the hand blurring switch 50 is ON, according to the output of the angular velocity sensor 36, the compensation lens 14 is controlled to move to the plane direction X which is vertical to the optical axis L1 so as to overcome the blurring. Also, when the hand blurring compensation switch 50 is OFF, the compensation lens 14 is fixed by a locking mechanism not shown at a position where the optical axis L1 and a center of the compensation lens 14 are coincided.

The mode switch 52 operates to select a sort of compensation operating motion. In the present embodiment, there are two modes which are Normal mode and Tripod mode. When the Normal mode is selected, compensation for an ordinal hand blurring as a target is operated, and when the Tripod mode is selected, compensation for a blurring occurred at the time of tripod shooting as target is operated. Note that it is possible to control with using a tripod determining algorithm which determines the tripod shooting condition automatically, based on the output of the angular velocity sensor 36, without using the mode switch 52.

Figure 4A:
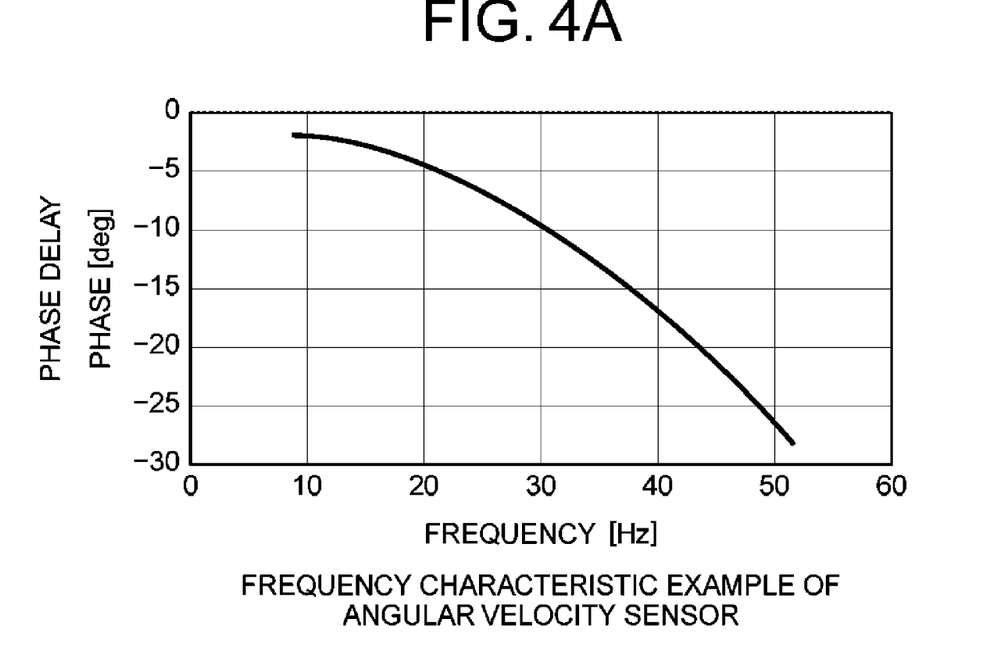
FIG. 4A is a graph showing a frequency characteristic of an angular velocity sensor.
Figure 4B:
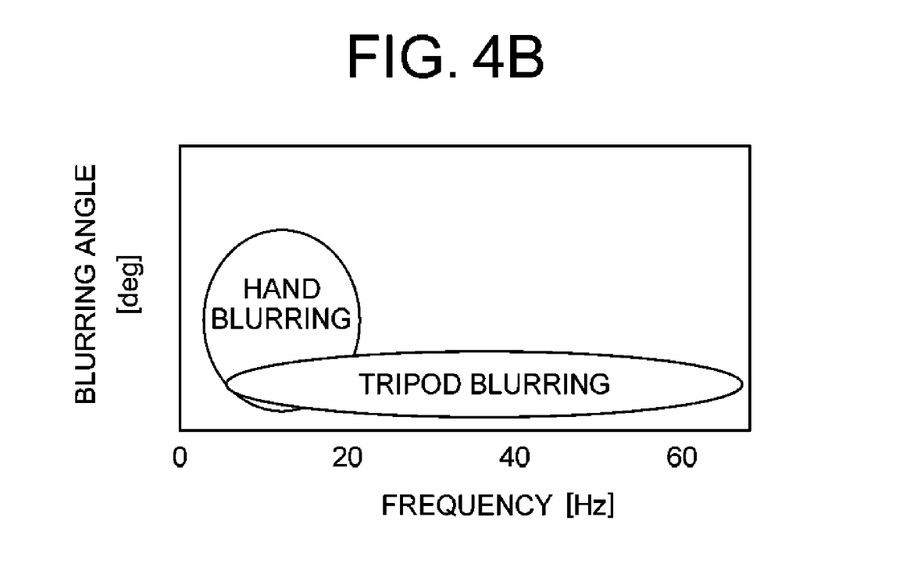
FIG. 4B is a graph showing relation of a blurring frequency and a blurring degree.

Difference of a normal hand blurring and a blurring of a tripod shooting will be specified. FIG. 4B shows an image drawing of frequency characteristics and amplitudes for the respective blurring. A frequency of a blurring of a camera of the tripod shooting is higher and a blurring amount is smaller.

In the follow-up controlling calculation unit 46 shown in FIG. 1, a conventionally known PID control is used. Frequency range by the PID control is, for example, 80 Hz or so, and it is hard to increase the range because of a sampling time relation. The angular velocity sensor 36 also includes LPF internally thereof for removing noise, and generally there is 15 to 20 deg or so of a delay at 40 Hz as shown in FIG. 4.

Namely, according to frequency characteristics of the angular velocity sensor 36 and the follow-up controlling unit 46 shown in FIG. 1, as a frequency characteristic of a whole system of the motion compensation system, a blurring amount increases at an accelerated pace after 30 Hz, and there is no compensation effect, on the contrary, there is a risk for deterioration.

Next, in a status that a camera is fixed on a unipod or a tripod (hereinafter, specified as tripod fixing) behavior of blurring of a camera and an operation example of the compensation lens in case of the camera shooting, are specified based on FIG. 1 to FIG. 3.

According to compensation motion during a half-pressing of the release switch 22 shown in FIG. 1, the blurring motion compensation lens 14 away from a center of the optical axis L1 receives an exposure starting signal sent from the body CPU 20 and performs centering operation to a center of the optical axis once, while the mirror 12 of the body 4 rises upwardly. According to this centering operation, an operating range of the compensation lens can be maintained and also, an exposure can be started at neighborhood of the optical axis where the deterioration of optical performance is less.

Figure 2:
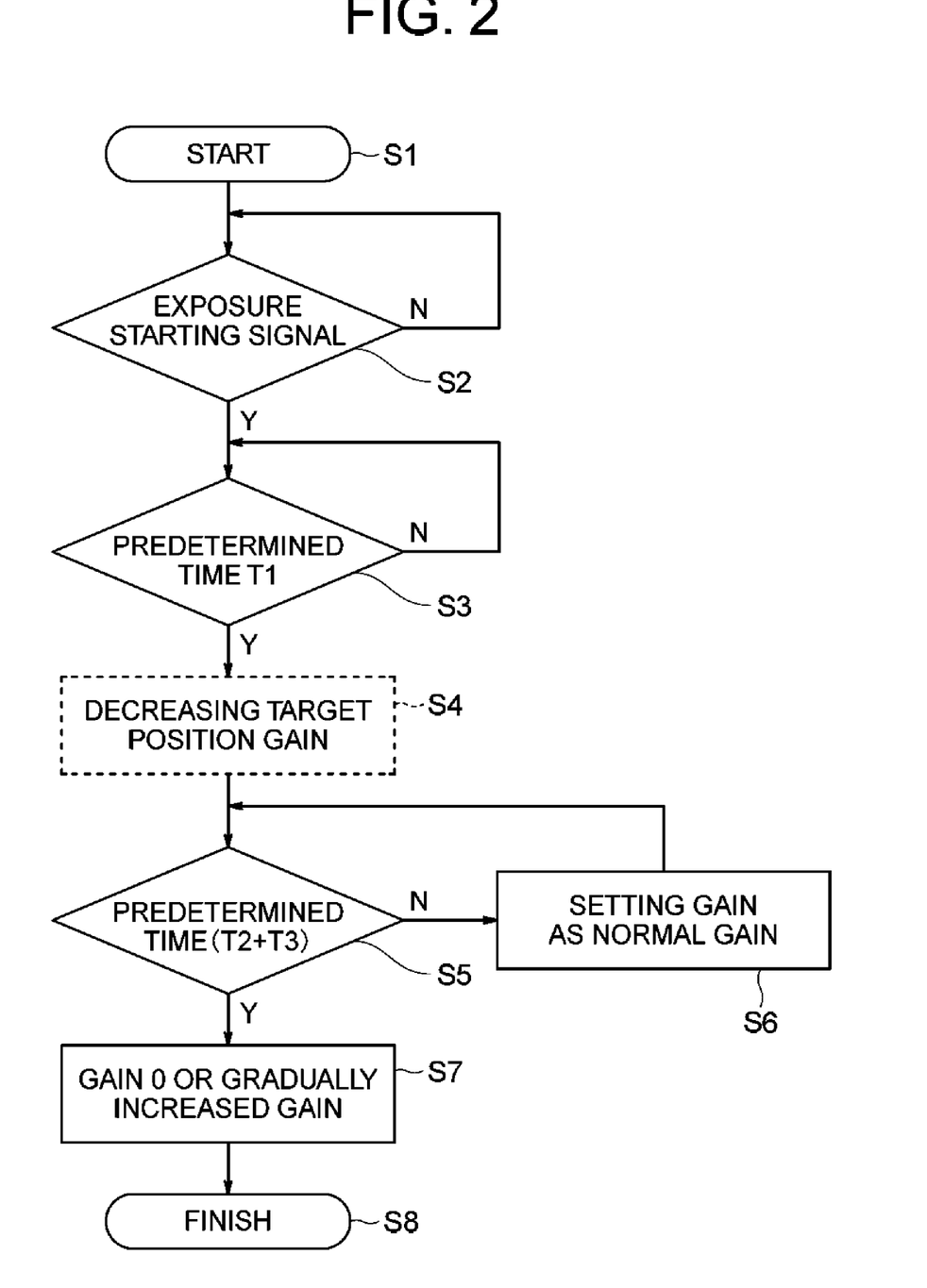
FIG. 2 is a flow chart showing one example for controlling the camera shown in FIG. 1.

When controlling is started at a step S1 shown in FIG. 2, the exposure starting signal is sent to the lens CPU 30 from the body CPU 20, by using the release switch 22 shown in FIG. 1 as a trigger. In accordance with the exposure starting signal, the compensation lens 14 re-starts compensation operation which is based on an output of the angular velocity sensor 36 again.

At a side of the camera body 4, the mirror 12 rises upwardly to open the shutter 10, and an exposure sequence is commenced. A tripod blurring occurs by the mirror 12 rising operation and an opening operation of the shutter. As previously mentioned, the base frequency of 10 Hz or so and the high frequency of the 50 Hz or so are mixed in the tripod blurring, and both frequencies appear in the target position information of the compensation lens 14. The compensation lens 14 can follow-up to a low frequency without problems, but delays to a high frequency. There is a risk to deteriorate the shooting result, in spite of the compensation operation.

As a result of this, conventionally, in case that a shutter speed is slow, compensation effect can be obtained, but in case that the shatter speed is fast, there is a risk to reverse the compensation effect.

Thus, in the present embodiment, due to a small blurring amount at the high frequency side and difficulty in rising compensation band, after starting shooting operation (for example, after starting the exposure), the target position gain is set as zero once, and then, the gain is raised according to lapse of time.

Figure 3:
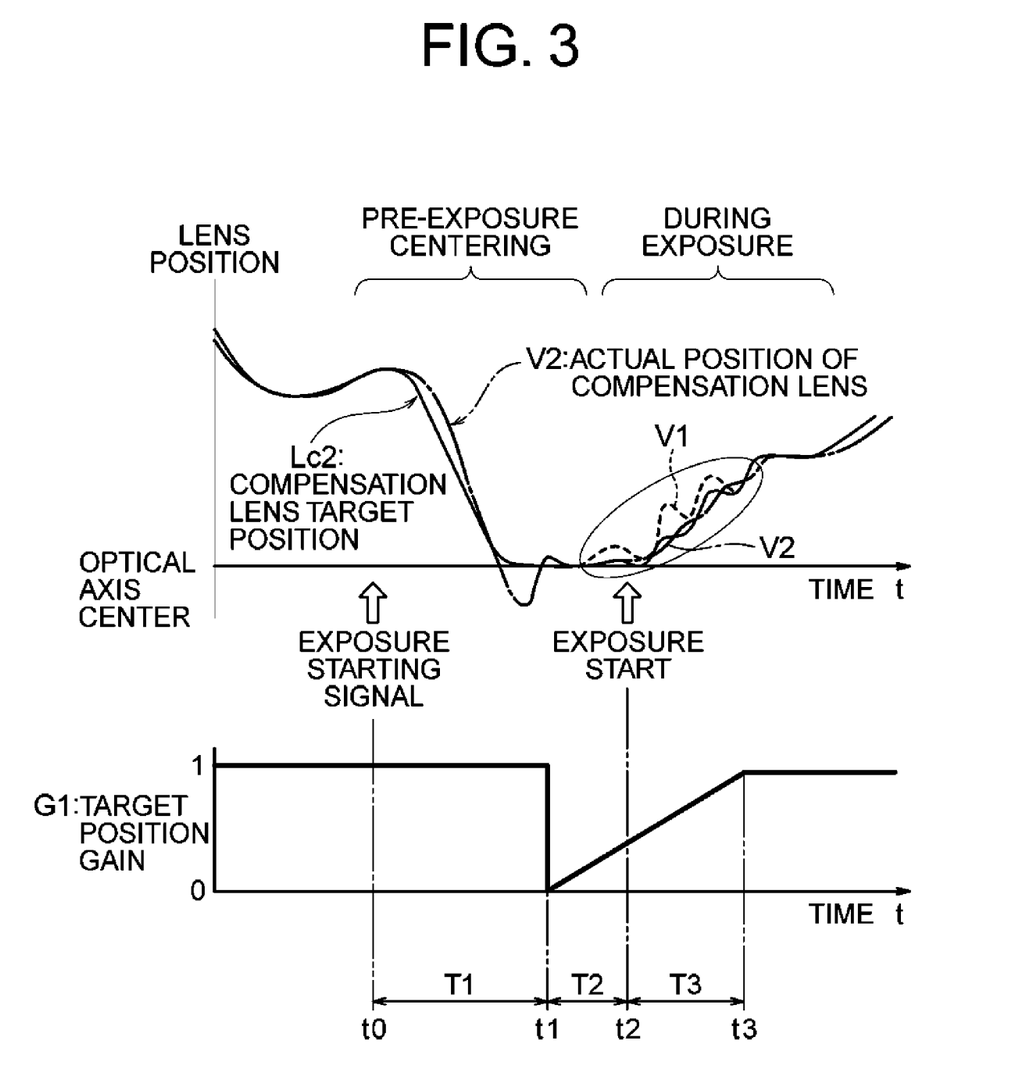
FIG. 3 is a time chart of controlling shown in FIG. 2.

Namely, at a step S2 shown in FIG. 2, in case that the lens CPU 30 shown in FIG. 1 receives the exposure starting signal, the lens CPU 30 measures a time from an exposure starting signal receiving time t0 shown in FIG. 3, at a step of S3 shown in FIG. 2. When the time from the exposure starting signal receiving time t0 exceeds a predetermined time T1 at a time point t1, the target driving position calculating portion 42 shown in FIG. 1 receives a control signal from the target position gain altering unit 44 at a step S4 shown in FIG. 2, and changes setting of a target position gain G1 from 1 to 0 as shown in FIG. 3.

Note that the target position gain G1 is a control coefficient at the time of obtaining a compensation lens target position lc2 after the gain calculation shown in a following formula.

$$lc2 = G1 \times (lc1 - LC\_center)$$

Here, lc1 is a target position of the compensation lens before the gain calculation, and LC_center is an optical axis center position (centering position) which is individually adjusted and written at the time of shipment from the factory.

In the present embodiment, after decreasing the target position gain G1 to 0 at a step 4 shown in FIG. 2, a time from a time point t1 shown in FIG. 3 at a step S5 is measured to determine whether the time is more than a predetermined time (T2+T3). A predetermined time T2 from the time point t1 shown in FIG. 3 is time from decreasing target position G1 to 0 to a time point t2 wherein an exposure is actually started. Also, a predetermined time T3, which is from a time point of shooting start, namely, the exposure time point t2, is time to a time point t3 where the target position gain G1 returns the original target position gain G1=1.

Namely, at a step S5 shown in FIG. 2, in case that a time from the time point t1 shown in FIG. 3 becomes more than a predetermined time (T2+T3), the target position gain G1 is set as G1=1 as a normal gain at a step S7 shown in FIG. 2, and in the target driving position calculating portion 42, calculation at the time of a normal hand blurring compensation is performed. When the exposure is finished, the control is finished at a step S8 shown in FIG. 2.

Also, at a step S5 shown in FIG. 2, in case that a time passage from the time point t1 shown in FIG. 3 does not fulfill the predetermined time (T2+T3), at a step S6 shown in FIG. 2, the target position gain G1 is raised gradually from 0 as shown in FIG. 3, based on a signal from the target position gain altering unit 44 shown in FIG. 1.

In the present embodiment, the predetermined time T1 differs depending on, for example, a release time-lag of the body, it is set by a time-lag information sent from the body, the predetermined time T2 is 5 to 15 msec, the predetermined time T3 is 30 to 50 msec.

As shown in FIG. 3, in the present embodiment, immediately after the exposure start, by the target position gain G1 of the compensation lens is set 0 once and gradually returns the gain G1, it is possible to prevent excessive response of the compensation lens to the blurring of high frequency component arise from a tripod blurring and the like. As a result in the present embodiment, the reverse phenomenon has been conventionally occurred at high shutter speed can be prevented.

For example, as shown by a dotted line of FIG. 3, in a conventional motion compensation device, the compensation lens has excessively been responded to the blurring the high frequency component arise from a tripod blurring and the like around the exposure starting time point t2. Against this, the motion compensation device of the present invention, by the compensation lens target position lc2 is calculated close to the gain G1=0 around the exposure starting time point t2, the blurring of an actual position of the compensation lens (dashed line V2) becomes smaller.

Namely, in the present embodiment, according to decreasing the gain G1 at the exposure starting time, the compensation lens does not move to follow the high frequency component uselessly, it becomes possible to minimize the deterioration of the compensation effects at the high shutter speed.

Note that the present invention is not limited to the above explained embodiment and can be modified within a scope of the present invention.

Figure 5A:
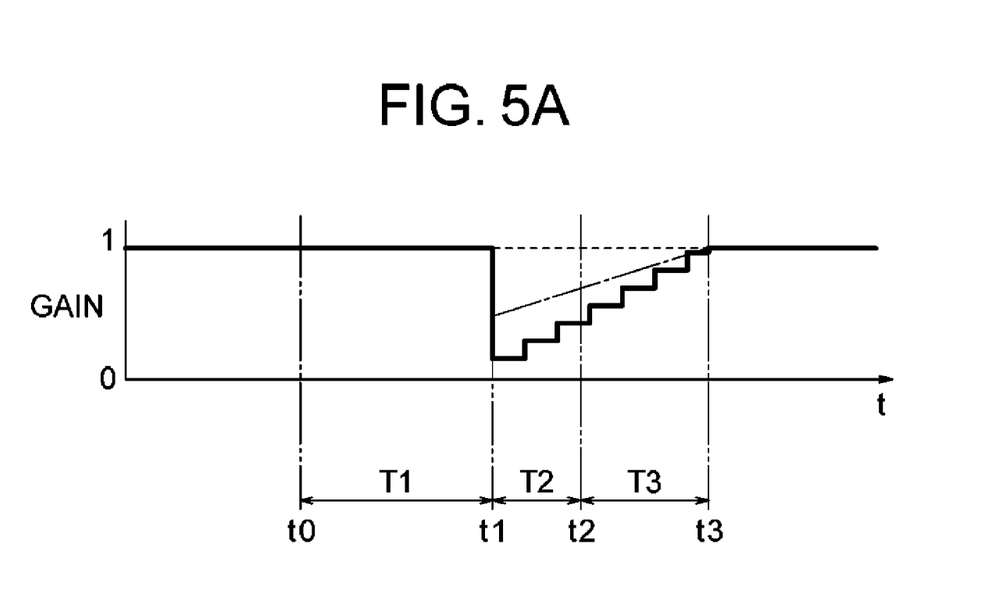
FIG. 5A and FIG. 5B are respective time charts showing a control method according to other embodiments of the present invention.

For example, as shown by a dashed line of FIG. 5A, after decreasing a gain G1 to ½ degree without decreasing the gain G1 to 0 at the time point t1 after passing a predetermined time T1 from a receiving time point t0 of an exposure starting signal, then after, the gain G1 may be returned gradually at a predetermined time (T2+T3). Alternatively, as shown by a solid line of FIG. 5A, after decreasing a gain G1 to near 0 degree at the time point t1 after passing a predetermined time T1 from a receiving time point t0 of an exposure starting signal, the gain G1 may be returned in a stepwise fashion at a predetermined time (T2+T3).

Also, in the present embodiment, a method for multiplying a gain to the target position of the compensation lens is shown, however, similar effects can be obtained by multiplying a gain to a target speed of the compensation lens.

Figure 5B:
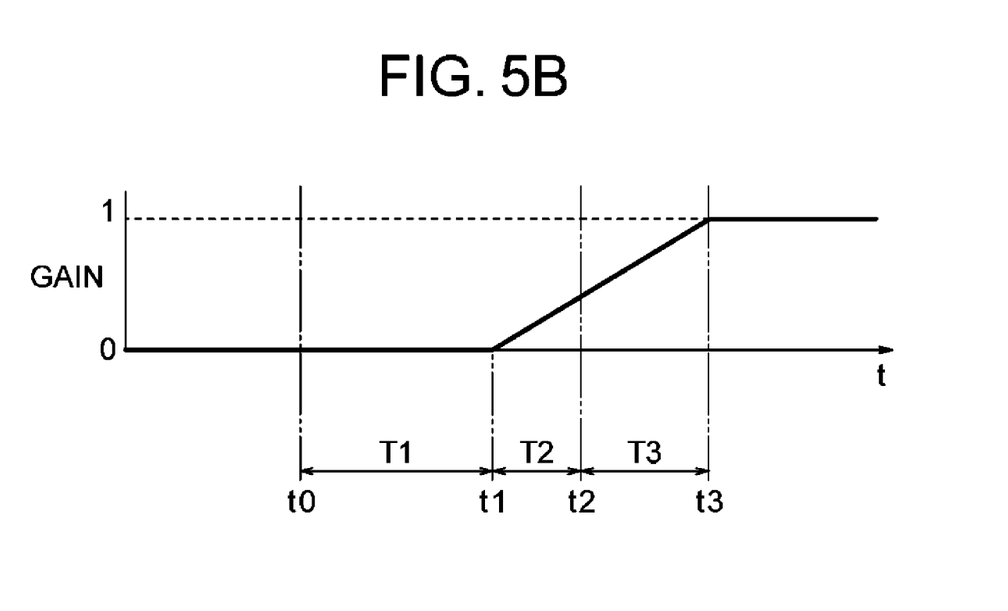

Further, as the other embodiment of the present invention, as shown in FIG. 5B, the gain G1 is set as 0 before a receiving time point t0 of the exposure starting signal, the gain G1 may be returned gradually to a normal gain starting from a time point t1 after lapse of the predetermined time T1 during a predetermined time (T2+T3). Such control can be used, for example, in case that a controlling mode that motion compensation is operated when the release switch 22 is fully pushed only, the motion compensation is not operated when the release switch is half-pushed.

Figure 6:
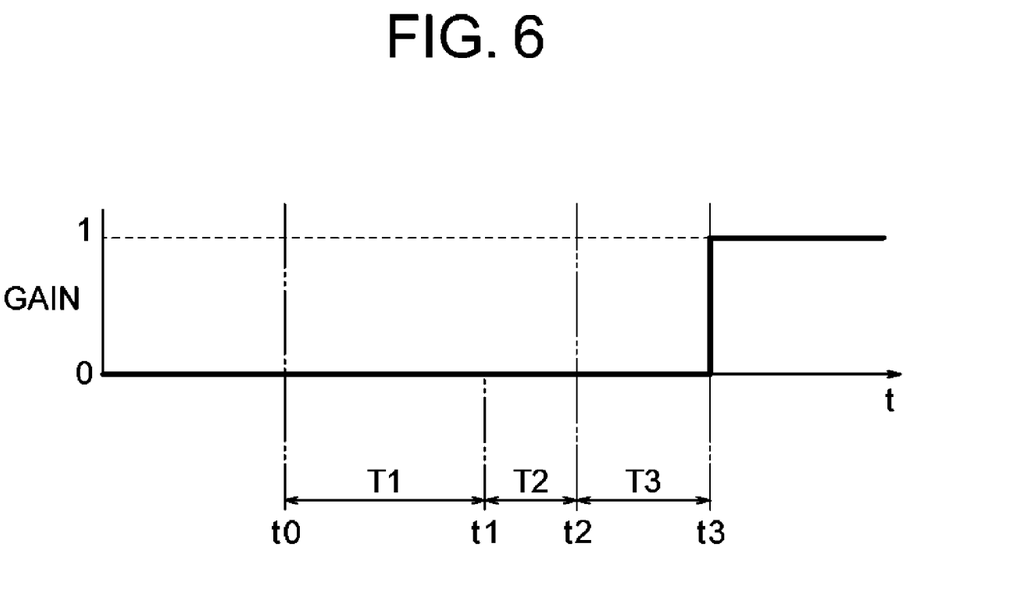
FIG. 6 is a time chart showing further embodiment of control method according to the present invention.

Further, as the other embodiment of the present invention, as shown in FIG. 6, the gain G1 is set as 0 before a receiving time point t0 of the exposure starting signal, the gain G1 may be returned rapidly to a normal gain starting from a time point t3 after lapse of the predetermined time (T1+T2+T3) from a time point t0. Alternatively, in FIG. 6, the gain G1 may be returned to a normal gain during time from any time point between the time points t2 and t3 to the time point t3.

Figure 1A:
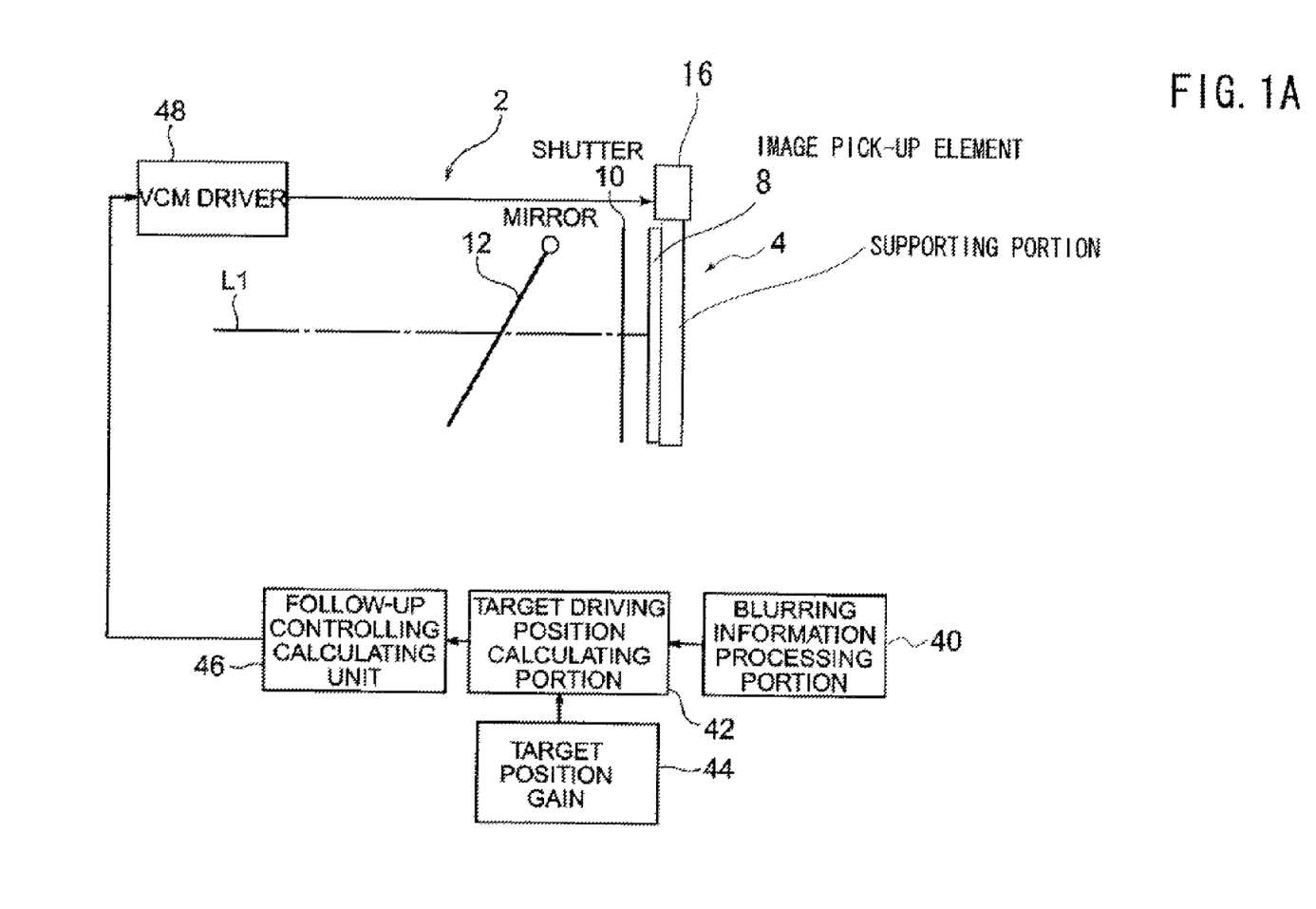
FIG. 1A is a schematic block view of an image pick-up element moving type motion compensation device including an image pick-up element holder according to another embodiment of the present invention.

Further, although an optical system moving type motion compensation device drive the compensation lens 14 shown in FIG. 1 is specified in the above mentioned embodiment, the present invention may be applied to an image-pick element moving type motion compensation device in which an image-pick up element 8 moves shown in FIG. 1A. Namely, the motion compensation device in the present embodiment comprises an image pick-up element supporting portion which supports the image pick-up element taking an image from an optical system, the image pick-up element supporting portion moves to at least one portion of the optical system in response to a calculated compensation amount which is calculated by the calculating portion 42 shown in FIG. 1A. Also, the present invention may be applied to an electronic type hand blurring (VR).

Further, in the present invention, the target driving position calculating portion 42 may comprise a first calculating portion of a target driving position at a first predetermined time (T2+T3) on before and after exposure stating and a second calculating portion of a target driving position at a second predetermined time (T3) after exposure starting. In that case, a first gain for calculating a target driving position at the first calculating portion is preferably lower than a second gain for calculating a target driving portion at the second calculating portion.

Furthermore, it is preferable that the first calculating portion and the second calculating portion are physically identical arithmetic circuit in which an arithmetic expression for calculating the target driving position is commonly used, and numerical values of the gain included in the arithmetic expression can be switched.

Alternatively, the first calculating portion and the second calculating portion are physically different arithmetic circuit, and after lapse of the second predetermined time (T3) after exposure starting time, it may be switched from the first calculating portion to the second calculating portion.

In the first calculating portion, the numerical value of the gain is an altering value gradually rises according to lapse of time, in the second calculating portion, the numerical value of the gain is a constant value according to lapse of time, which are preferable.

Also, in the present invention, as a support output portion which outputs a first signal when an imaging device such as a camera and the like are supported on a fixed base is not limited to the mode switch 52 shown in FIG. 1, a slide operation switch, a push down type (tact switch) and a tripod automatic determining circuit may be used.

The invention claimed is:

1. A motion compensation device comprising:
   a detector to detect a vibration of an imaging device which takes an image; and
   a controller to control a compensation amount of an influence of said vibration based on an output of said detector,
   said controller increasing said compensation amount according to lapse of shooting time of said imaging device after starting shooting operation and after starting exposure.

2. The motion compensation device as set forth in claim 1, further comprising:
   a motion compensator to compensate said influence of said vibration by relatively moving an image formed with an optical system and an image pick-up face of said imaging device based on the output of said detector,
   wherein said controller comprises:
   a target position calculator which calculates a target position so as to move said motion compensator;
   an amplifier which amplifies and outputs a signal from said target position calculator; and
   an altering portion which increases an amplification ratio of said amplifier according to lapse of shooting time of said imaging device.

3. The motion compensation device as set forth in claim 1, further comprising:
   a motion compensator to compensate said influence of said vibration by relatively moving an image formed with an optical system and an image pickup face of said imaging device based on the output of said detector,
   wherein said controller comprises:
   a target position calculator which calculates a target position so as to move said motion compensator; and
   an altering portion which changes said target position so as to increase a moving amount of said motion compensator according to lapse of shooting time of said imaging device.

4. The motion compensation device as set forth in claim 1, wherein said controller increases said compensation amount according to lapse of shooting time of said imaging device after decreasing said compensation amount in response to timing of shooting of said imaging device.

5. A photographic device comprising a motion compensation device as set forth in claim 1.

6. The motion compensation device as set forth in claim 1, further comprising an optical system holder to hold at least one portion of an optical system,
   wherein said optical system holder relatively moves with respect to an image pick-up face of said imaging device in response to said compensation amount controlled by said controller.

7. The motion compensation device as set forth in claim 1, further comprising:
   an image pick-up element holder for holding an image pick-up element to pick-up an image by an optical system,
   wherein said image pick-up holder relatively moves with respect to at least one portion of said optical system in response to said compensation amount controlled by said controller.

8. A motion compensation device comprising:
   a detector to detect a vibration of an imaging device which takes an image; and
   a controller to control a compensation amount of an influence of said vibration based on an output of said detector,
   said controller increasing said compensation amount according to lapse of shooting time of said imaging device,
   wherein said imaging device comprises a first output portion to output a first signal when the imaging device is in an image shooting mode where said imaging device is supported on a support base, and
   wherein said controller increases said compensation amount according to shooting time of said imaging device when said first signal is output from said first output portion.

9. The motion compensation device as set forth in claim 8, wherein said support base is a unipod or a tripod.

10. The motion compensation device as set forth in claim 8, further comprising:
    a determining portion to determine as to whether said imaging device is supported on said support base or not, based on the output of said detector,
    wherein said first output portion outputs said first signal when said detector determines that said imaging device is supported on said support base.

11. A photographic device comprising:
    a detector to detect a blurring of the device;
    a driving portion to be driven at least mechanically in response to shooting action; and
    a controller connected with said detector and said driving portion,
    wherein the controller controls a compensation amount for blurring motion of said image so as to gradually increase the compensation amount according to lapse of shooting time of an imaging device after starting shooting operation.

12. The photographic device as set forth in claim 11, wherein said controller increases said compensation amount according to lapse of shooting time of said imaging device in response to shooting action.

13. The photographic device as set forth in claim 11, wherein said driving portion is a shutter to cut off a photographic light or a mirror which retracts so as not to prevent the photographic light in response to shooting action.

14. The photographic device as set forth in claim 11, wherein said controller increases said compensation amount according to lapse of shooting time of said imaging device after reducing said compensation amount prior to said driving portion operates in response to shooting action.

15. A photographic device comprising:
a detector to detect a blurring of the device;
a driving portion to be driven at least mechanically in response to shooting action;
a controller connected with said detector and said driving portion, said controller cooperates with said driving portion to control a compensation amount for blurring motion of said image so as to increase the compensation amount according to lapse of time after said driving portion driven; and
a first output portion to output a signal to said controller, the signal showing that the device is supported on a support base,
wherein said controller increases said compensation amount according to lapse of time after operating said driving portion in response to the output from said first output portion showing that the device is supported on the support base.

16. A motion compensation method comprising steps of:
detecting a blurring of a imaging device taking an image from an optical system with using a detector; and
controlling a compensation amount for correcting said image on the basis of the detected blurring of said imaging device,
wherein said compensation amount gradually increases according to lapse of shooting time of said imaging device after starting shooting operation.

17. The motion compensation method as set forth in claim 16, wherein said compensation amount increases according to lapse of shooting time of said imaging device after decreasing said compensation amount in response to timing of shooting of said imaging device.

18. A motion compensation method comprising steps of:
detecting a blurring of a imaging device taking an image from an optical system with using a detector; and
controlling a compensation amount for correcting said image on the basis of the detected blurring of said imaging device,
wherein said compensation amount increases according to lapse of shooting time of said imaging device when a signal is output, showing a shooting mode where the imaging device is supported on a support base.

19. A method for manufacturing a motion compensation device, said method comprising:
providing a detector to detect blurring of an imaging device which takes an image from an optical system;
connecting a controller with said detector to control a compensation amount for correcting said image blurring based on an output of said detector; and
setting said controller to increase the compensation amount according to lapse of shooting time of said imaging device after starting shooting operation and after starting exposure.

20. The method for manufacturing a motion compensation device as set forth in claim 19, wherein said controller is set to increase said compensation amount according to lapse of shooting time of said imaging device, after said compensation amount is decreased in response to timing of shooting of said imaging device.

21. A method for manufacturing a motion compensation device, said method comprising:
providing a detector to detect blurring of an imaging device which takes an image from an optical system;
connecting a controller with said detector to control a compensation amount for correcting said image blurring based on an output of said detector; and
setting said controller to increase the compensation amount according to lapse of shooting time of said imaging device,
wherein said controller is set to increase said compensation amount according to lapse of shooting time of said imaging device, when a first signal is output in an image shooting mode that said imaging device is supported on a support base.

22. A method for manufacturing a motion compensation device, said method comprising:
providing a detector to detect blurring of an imaging device which takes an image from an optical system;
connecting a controller with said detector to control a compensation amount for correcting said blurring of image based on an output of said detector;
connecting said controller with a driving portion to be driven mechanically in response to shooting action of said imaging device; and
setting said controller to gradually increase the compensation amount according to lapse of time after driving said driving portion in response to shooting action of said imaging device after starting shooting operation.

23. The method for manufacturing a motion compensation device as set forth in claim 22, wherein said controller is set to increase said compensation amount according to lapse of shooting time of said imaging device, after said compensation amount is decreased prior to driving said driving portion in response to shooting action of said imaging device.

24. The method of manufacturing a motion compensation device as set forth in claim 22, wherein said controller is set to increase said compensation amount according to lapse of shooting time of said imaging device after starting exposure.

25. A method for manufacturing a motion compensation device, said method comprising:
providing a detector to detect blurring of an imaging device which takes an image from an optical system;
connecting a controller with said detector to control a compensation amount for correcting said blurring of image based on an output of said detector;
connecting said controller with a driving portion to be driven mechanically in response to shooting action of said imaging device; and
setting said controller to increase the compensation amount according to lapse of time after driving said driving portion in response to shooting action of said imaging device,
wherein said controller is set to increase said compensation amount according to lapse of shooting time of said imaging device, when a signal is provided to show that said imaging device is supported on a support base.

26. A motion compensation device comprising:
a detector to detect a vibration of an imaging device which takes an image; and
a controller to control a compensation amount of an influence of said vibration based on an output of said detector,
said controller increasing said compensation amount according to lapse of shooting time of said imaging device after starting shooting operation and receiving an exposure starting signal.

27. The motion compensation device as set forth in claim 26, wherein said controller increases said compensation amount according to lapse of shooting time of said imaging device after starting shooting operation and passing a predetermined time from receiving the exposure starting signal.

* * * * *